B. WEHNER.
DRIVING CENTER FOR LATHES.
APPLICATION FILED JUNE 5, 1907.

913,594.

Patented Feb. 23, 1909.

WITNESSES.

INVENTOR.

UNITED STATES PATENT OFFICE.

BENJIMAN WEHNER, OF NORTH BRADDOCK, PENNSYLVANIA.

DRIVING-CENTER FOR LATHES.

No. 913,594.  Specification of Letters Patent.  Patented Feb. 23, 1909.

Application filed June 5, 1907. Serial No. 377,337.

*To all whom it may concern:*

Be it known that I, BENJIMAN WEHNER, a resident of North Braddock, in the county of Allegheny and State of Pennsylvania, have invented certain new and useful Improvements in Driving-Centers for Lathes, of which the following is a specification.

One object of this invention is to provide a driving center wherein the work holding means is adjustable longitudinally of the centering spindle so that it may be out of the way when positioning the work in the lathe.

Another object is to provide the work holding mechanism with an adjustment transversely of the spindle so that it will accommodate itself to work heavier or thicker at one side of the center point than the other.

Still a further object is to provide improved means for operating the work clamping levers, affording them a greater range of adjustment than heretofore.

Figure 1:
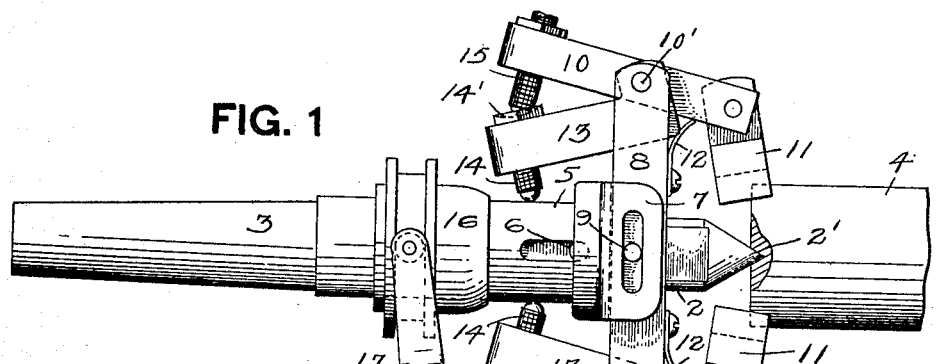
Figure 3:
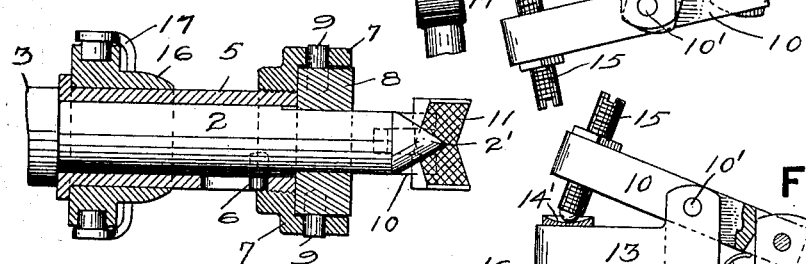
Figure 2:
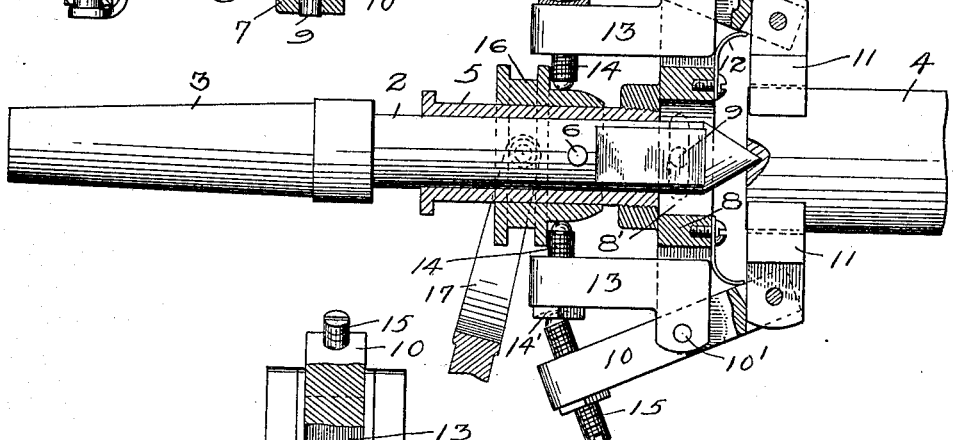
Figure 4:
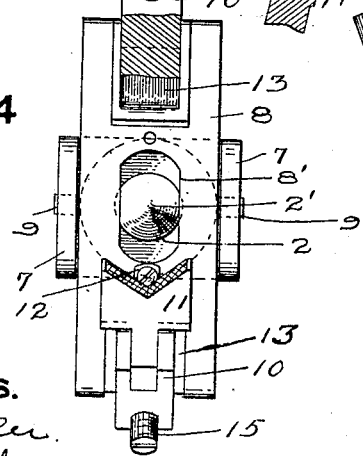

In the accompanying drawings, Figure 1 is a side elevation of the improved device, showing the work clamping mechanism retracted from holding position. Fig. 2 is a longitudinal sectional view, showing the device adjusted to holding position. Fig. 3 is a central longitudinal sectional view taken at right angles to Fig. 2. Fig. 4 is a front elevation, partly in section.

Referring to the drawings, 2 designates the spindle of the device and 3 the shank portion thereof which may be secured in the usual tubular driving spindle of a lathe (not shown) in any suitable manner. The forward extremity of spindle 2 is formed with point 2' for centering the work 4. Slidable longitudinally on spindle 2 is tubular body 5, having pin and slot connection 6 with the spindle for limiting its movement thereon. At the forward end of body 5 is transverse slideway 7, and movable therein transversely of the spindle is head 8, the movement being limited by the pin and slot connection 9 with slideway 7. Head 8 is slotted centrally at 8' to embrace and move on the spindle as shown. Pivoted at 10' between their ends to the opposite extremities of head 8 are levers 10 each at its forward end carrying a work clamping shoe 11, with springs 12 tending normally to turn the levers with the shoes out of engagement with the work. Also pivoted to head 8 between the rear portion of levers 10 and body 5 are arms 13, which are preferably mounted on pivots 10' together with levers 10. Projecting inwardly through each of arms 13 is screw 14, having a coned depression 14' in its outer end, and bearing in this depression is the inner end of screw 15 adjustable in lever 10. With the work holding device retracted, as in Fig. 1, screws 14 bear inwardly against body 5, and to separate or move outwardly arms 13 and levers 10 to work holding position, a cone collar 16 is slidable on body 5 between screws 14, any suitable form of yoke 17 being provided for moving the same.

In operation, the work holding mechanism is retracted on spindle 2, as in Fig. 1, so that shoes 11 are not in the way of inserting or centering the work on spindle point 2'. With the work thus positioned, cone 16 is moved inward and the movement thereof not only oscillates the levers as above described, but also forces body 5 and the clamping mechanism carried thereby toward the centering end 2' of the spindle and projects shoes 11 over the work and into position to clamp the same. Similarly, the retraction of cone 16 when releasing the work also moves backward body 5 and the clamping mechanism. As the work is being clamped, the sliding movement of head 8, afforded by pin and slot connection 9, permits the clamping members and shoes to adjust themselves to the work, as when the same is heavier or thicker at one side of the center than the other. Arms 13, interposed between the levers and body 5, afford levers 10 a greater range of adjustment than though the inward projections or screws, such as 14, operated upon by cone 16, were carried by the levers. As a result of this arrangement, screws 14 always bear the same relation to the cone 16 regardless of the throw of levers 10, this throw being determined by screws 15 which may be adjusted either inward or outward as required, such adjustment not affecting their bearing in the coned seats 14'.

I claim:—

1. The combination of a body slidable longitudinally on a centering spindle and having a transverse slideway at its forward end, a head slidably mounted in the slideway and having an opening through which the spindle extends for affording the head movement transversely of the spindle, means for limiting the transverse movement of the head, and work-clamping devices carried by the head at opposite sides of the spindle.

2. The combination of a spindle, a tubular body slidable thereon and having a pin and slot connection therewith, the body having a transverse slideway at its forward end, a head slidable in the slideway and having an opening through which the spindle extends, a pin and slot connection between the head and slideway, and work-holding devices carried by the head.

3. The combination of a spindle, a head rotatable therewith, a pair of oppositely arranged levers pivoted between their ends to said head, a pair of arms between the levers and mounted on the lever pivots, the levers being adapted at their forward ends to secure the work, adjusting screws connecting the rear ends of the levers and said arms, and means for turning the arms on said pivots.

4. The combination of a spindle, a tubular body rotatable therewith and freely movable longitudinally thereof, work clamping levers movable with the body, and lever operating means movable on the body.

5. The combination of a spindle, a tubular body through which the spindle extends, a lever mounting slidable on the body transversely of the spindle, work holding levers on said mounting and a lever operating device slidable on said tubular body.

In testimony whereof I affix my signature in presence of two witnesses.

BENJIMAN WEHNER.

Witnesses:
 J. M. NESBIT,
 ALEX. S. MABON.